United States Patent
Ezaki et al.

(10) Patent No.: US 6,541,058 B1
(45) Date of Patent: Apr. 1, 2003

(54) PROCESS FOR PRODUCING WET OKARA

(75) Inventors: Mitsuo Ezaki, Izumisano (JP);
Kurimoto Mitsuyoshi, Izumisano (JP);
Yasuhumi Kanada, Izumisano (JP);
Mihoko Inaba, Izumisano (JP);
Masayuki Yamaguchi, Izumisano (JP)

(73) Assignee: Fuji Oil Company, Limited, Osaka-fu (JP)

( * ) Notice: Subject to any disclaimer, the term of this patent is extended or adjusted under 35 U.S.C. 154(b) by 105 days.

(21) Appl. No.: 09/713,225

(22) Filed: Nov. 16, 2000

(30) Foreign Application Priority Data

Nov. 18, 1999 (JP) .............................. 11-328733

(51) Int. Cl.$^7$ .............................. A23L 3/16; A23L 1/20
(52) U.S. Cl. ........................ 426/521; 426/399; 426/413; 426/634; 426/518
(58) Field of Search ................................ 426/634, 507, 426/508, 521, 399, 413, 518

(56) References Cited

U.S. PATENT DOCUMENTS 4,702,927 A * 10/1987 Hirotsuka et al.

FOREIGN PATENT DOCUMENTS

| JP | 56-68356 | * | 6/1981 |
| JP | 58-101656 | * | 6/1983 |
| JP | 60-227650 | * | 11/1985 |
| JP | 61-166374 | * | 7/1986 |
| JP | 3-210164 | * | 9/1991 |
| JP | 4-190753 | * | 7/1992 |
| JP | 5-3761 | * | 1/1993 |
| JP | 5-5516 | * | 1/1993 |
| JP | 7-289192 | * | 11/1995 |
| JP | 8-266240 | * | 10/1996 |
| JP | 9-322729 | * | 12/1997 |
| JP | 10-113142 | * | 5/1998 |
| WO | WO 9941999 | * | 8/1999 |

OTHER PUBLICATIONS

Noguchi et al, Vegetable Protein Utilization in Human Foods and Animal Feedstuffs: Proceedings of World Congress, Singapore 375–381, 1988.*
Food Industrial Exp. Stn. Tochigiken Kogyo Shiken Kenkyu Kikan Kenkyu Shuroku, vol. 1992, p. 307–311, Akio et al, 1993.*
Steriliz. of Okara in High Pressure Processing, Akio et al vol. 1992, p. 303–306, 1993.*
Brochure of CONTHERM, A Scraped–Surface Heat Exchanger, Aug. 1977.

* cited by examiner

Primary Examiner—Steve Weinstein
(74) Attorney, Agent, or Firm—Wenderoth, Lind & Ponack, L.L.P.

(57) ABSTRACT

Wet okara is produced by finely dividing wet okara, feeding it into a scraper type heat exchanger, heating at a temperature of not lower than 120° C., cooling the heated product and filling and sealing the cooled product in a container or package aseptically. By this process, wet okara can be sterilized continuously to obtain okara having good preservability without deterioration of water retention characteristics.

4 Claims, No Drawings

PROCESS FOR PRODUCING WET OKARA

BACKGROUND OF THE INVENTION

1. Field of the Invention

The present invention relates to a process for producing wet okara ("okara" is insoluble residue from "tofu", or soymilk or soy protein production, and also known as soy pulp). More specifically, it relates to a process for producing wet okara by continuous sterilization.

2. Disclosure or the Prior Art

Okara has been used as a raw material of various food products and, in many cases, dried okara is predominantly used from the viewpoint of preservability. However, dried okara has a problem that it is inferior not only in water retention characteristics and reconstitution properties with water, but also in energy costs compared with those prior to drying.

On the other hand, although wet okara produced by heat sterilization with a batch-wise retort is marketed slightly, there are problems that the wet okara is hardly dispersed due to hardening with time and is liable to be colored, and its taste is spoiled. Further, although wet okara produced by a continuous production process is also known, since it is produced by application of electric current, it is difficult to elevate a temperature of wet okara by application of electric current unless salt is present. Then, when salt concentration is increased, the taste of wet okara is spoiled.

OBJECTS OF THE INVENTION

An object of the present invention is to provide a process for producing wet okara by continuous sterilization.

Another object of the present invention is to provide a process for producing wet okara having good preservability without deterioration of water retention characteristics.

These objects and other objects as well as advantages of the present invention will become apparent to those skilled in the art from the following description.

SUMMARY OF THE INVENTION

First, the present inventors attempted to use a scraper type heat exchanger as an apparatus for continuous sterilization of conventional okara. However, this continuous sterilization was unsuccessful because the surface of inner wall of the heat exchanger and pumps used were clogged with okara, when conventional okara was used. Then, the present inventors have studied continuous sterilization of wet okara intensively. As a result, it has been found that okara can be sterilized continuously by a scraper type heat exchanger without the above clogging problem by using finely divided wet okara having a specific particle size. Thus, the present invention has been completed.

That is, according to the present invention, there is provided a process for producing wet okara which comprises finely dividing wet okara, feeding it into a scraper type heat exchanger, heating at a temperature of not lower than 120° C., cooling the heated product and filling and sealing the cooled product in a container or package aseptically. The wet okara of the present invention has good preservability.

In the present invention, preferably, the finely divided wet okara has a particle size of 10 to 100 μm (the particle size is determined by a coulter counter). Further, preferably, the wet okara has a water content of at least 70% (by weight, hereinafter all percents are by weight unless otherwise stated), and the scraper type heat exchanger has an indirect heating part equipped with at least one scraper blade and outer tubing, and is combined with a forced-feeding part, a holding part and a cooling part.

DETAILED DESCRIPTION OF THE INVENTION

The okara to be used in the present invention may be that derived from whole soybeans or defatted soybeans. The former okara is mainly obtained from "tofu" production and the latter okara is mainly obtained from production of isolated soybean protein using defatted soybeans which has been obtained from soybean oil production.

Suitably, the okara to be used in the present invention has a water content of 70% or more, normally 70 to 95%, preferably 75 to 90%, more preferably 80 to 90%.

When a water content of okara is too low, it is difficult to feed it into a scraper type heat exchanger with a pump at its forced-feeding part. Further, when the okara is eaten after passing through a scraper type heat exchanger, it has gritty mouthfeel, which spoils the taste thereof.

On the other hand, when a water content of okara is too high, okara dispersed in water is precipitated, which causes a watery taste, though a scraper type heat exchanger can be easily driven.

Suitably, the average particle size of okara in a wet state to be fed to a scraper type heat exchanger is 10 to 100 μm, preferably 10 to 50 μm, more preferably 20 to 40 μm. The particle size used herein is that determined by a coulter counter. However, since conventional okara cannot pass through a coulter counter, its average particle size was determined by sieve analysis in a wet state.

When okara has the fine particle size, fluidity is increased and okara can readily pass through a scraper type heat exchanger, thereby facilitating heat sterilization. On the other hand, when okara, such as commercially available one, has a larger particle size, okara is difficult to pass through a scraper type heat exchanger, which causes difficulties in continuous sterilization.

For example, conventional okara obtained from "tofu" production has an average particle size of, normally, about 200 to 1,000 μm. When okara having such a larger particle size is try to feed into a scraper type heat exchanger, okara adheres to the inner wall of a pump at its forced-feeding part, and/or the pump is clogged with so-called "navel of soybean" having a particle size of about 2 to 5 mm, which causes difficulties in constant feeding of okara into the scraper type heat exchanger. Even if a water content is 80% or higher, okara having such a larger particle size shows dry and loose appearance and has no such fluidity as that of the okara to be used in the present invention which has the same water content. Therefore, it is difficult to pressurize okara to feed it into a scraper type heat exchanger. Thus, a commercially available wet okara is sterilized by a batch-wise retort.

The scraper type heat exchanger to be used in the present invention is combined with a forced-feeding part (a) for feeding okara by pressurization.

For feeding okara by pressurization, a feed pump can be used. As the pump, Mono Pump™ can be used generally. However, when okara has considerably high viscosity, a force pump (e.g., screw pump) can be used before Mono Pump™ to stabilize a flow rate.

The scraper type heat exchanger to be used in the present invention has an indirect heating part (b) equipped with at least one scraper blade and outer tubing. The outer tubing is preferably jacketed twofold tubing. Okara is forced to feed into and passing through this outer tubing. Steam (high pressure steam: 2 to 5 kg/cm$^2$, saturated vapor temperature: 120 to 170° C.) or water heated to an elevated temperature is passed through the jacket and the inner wall of the jacketed tubing is continuously scraped and renewed with sharp scraper blades (normally, 2 to 4 blades) attached to a rotor part to prevent scorching. Suitably, the scraper blades (the rotor, etc.) are allowed to revolve smoothly on the inner wall of the outer tubing in the indirect heating part to improve heat conduction of okara fed to the scraper type heat exchanger. Further, suitably, the clearance between the inner wall of the outer tubing and the blade (rotor) is 5 to 50 mm, preferably 10 to 30 mm, more preferably 15 to 25 mm to reduce pressure loss of okara fed in the scraper type heat exchanger.

Okara is sterilized by heating at a temperature of not lower than 120° C., preferably, 120 to 150° C.

The scraper type heat exchanger to be used in the present invention is combined with a holding part (c). Preferably, holding time is 2.6 to 26 minutes in case of sterilization at 120° C., 49 seconds to 8.1 minutes in case of sterilization at 125° C., 16 seconds to 2.6 minutes in case of sterilization at 130° C., 5 to 49 seconds in case of sterilization at 135° C., 1.5 to 15.5 seconds in case of sterilization at 140° C. and 0.5 to 5 seconds in case of sterilization at 145° C. When the holding time is longer than this, the color and taste of okara are spoiled. In addition, okara stored at 5° C. for more than 1 week becomes harder and its dispersibility becomes inferior. On the other hand, when the holding time is shorter than this, sterilization is liable to be insufficient, which results in inferior preservability. The holding part may be a tank or tubing.

The scraper type heat exchanger to be used in the present invention is combined a cooling part (d). Suitably, okara is cooled to lower than 100° C. in a pressurized state at an outlet of the cooling part. If the heated okara is rapidly cooled to lower than 100° C. under normal pressure without providing a cooling part, bumping occurs and air (vapor) escape is caused. This is undesired.

In the present invention, the forced-feeding part (a), the holding part (c) and the cooling part (d) may be combined with one another in one scraper type heat exchanger. Alternatively, they may be separate devices. As the cooling part (d), another scraper type heat exchanger can be used.

Normally, the scraper type heat exchanger is pressurized by a valve at an outlet of the cooling part. In view of workability and sterility, preferably, the pressurization is carried out by two-stage pressurization, i.e., first, pressurizing at the holding part and then pressurizing at the outlet of the cooling part.

When sterilized okara is passed through the holding and cooling parts, a temperature drop of okara is observed due to its high viscosity (even sterilization at 140° C., the temperature of okara is dropped to 120° C. or lower) and contamination is liable to be caused because of loss of sterility in the holding part and subsequent thereto. Then, suitably, back pressure is applied to the holding part and okara is returned to the original raw material (e.g., a feeding tank) until the temperature of okara at the holding part rises to the desired sterilization temperature. When the okara rises to the desired temperature, it is run into the cooling part. For this purpose, preferably, back pressure-adjusting valves are provided to both holding and cooling parts. In case that the line is relatively long, transportation pressure of the line can be used instead of application of back pressure.

In so far as the above functions are available, any kind of a scraper type heat exchanger can be used in the present invention. For example, a commercially available scraper type heat exchanger, Contherm™ (scraped surface heat exchanger) manufacture by Alfa Laval Contherm Inc. MA, U.S.A. can be used.

Okara thus heat-sterilized is aseptically filled and sealed in a container or package. For aseptically filling and sealing in a container or package, normally, an aseptic filler device for semi-aseptic or aseptic filling can be utilized. In case of semi-aseptic filling, okara can be packed in inner pouches or boxes of a packaging material under a high temperature atmosphere (70 to 90° C.). At the same time, this can serve as sterilization of the inner pouches or boxes. Preferably, filling is carried out under an atmosphere of NASA 10000 class or more clean (NASA 10000 is such a state that not more than 0.5 finely divided particle having a particle size of 0.5 μm or larger is present in a space of 1 ft$^3$), thereby preventing contamination of microbes from the outside and adhesion of dust to pillow type packages before using them for packaging due to static electricity.

In case of aseptic filling, after cooling to 10° C. or lower by the scraper type heat exchanger, okara can be filled and sealed in pillow type packages (manufactured by Orihiro, Japan) or Scholle™ (bag in box) (manufactured by Toppan Printing Co., Ltd., Japan).

As described hereinabove, according to the present invention, okara can be sterilized continuously.

The following Preparations, Examples, Comparative Examples further illustrate the present invention in detail but are not to be construed to limit the scope thereof. Hereinafter, all parts are by weight unless otherwise stated.

Preparation 1

In Case of High Soaking Temperature Finely divided okara was prepared as follows.

Water (10 parts) were added to dehulled and hypocotyl-removed soybeans (1 part) to carry out soaking at 85 to 95° C. for more than 60 minutes. Hot water (90° C.) (3 parts) was added to the resultant soybeans sufficiently absorbing water (1 part) (water content: 40 to 50%) and the mixture was treated twice with Comitrol™ (a cutter having rotary blades for cutting a material by shear force; manufactured by Urschel) to obtain a slurry of finely divided soybean particles having an average particle size of 45 μm.

The slurry thus obtained was homogenized by treating twice with a high pressure homogenizer (manufactured by APV) at 200 kg/cm$^2$ to obtain a slurry of finely divided soybean particles having an average particle size of 25 μm.

The homogenized slurry of finely divided particles was centrifuged by treating a centrifuge (manufactured by Tomoe Kogyo, Japan) at 3,000 G for 5 minutes to obtain okara. The resultant finely divided okara had a solids content of 14%.

Preparation 2

Commercially available okara from "tofu" production contained hulls and hypocotyl of soybeans because it was produced by soaking whole soybeans without removal of hulls and hypocotyl and roughly grinding with a stone mill (e.g., Microcolloider, etc.) . In comparison with that of Preparation 1, this okara had a higher solid content such as 19% and a larger average particle size such as 400 μm or more, and was blackish.

Preparation 3

Water (10 parts) was added to dehulled and hypocotyl-removed soybeans (1 part) to carry out soaking at 50 to 65°

C. for 60 minutes or more. According to the same manner as described in Preparation 1, finely divided okara having a solid content of 14% was obtained.

EXAMPLE 1

Two scraper type heat exchangers (Contherm™), each having jacketed outer tubing part and a rotor with four blades contained therein, each end of the rotor being sealed with a mechanical seal, were connected in series through a holding tubing to be used as a holding part. One heat exchanger was used as a heating part and the other was used as a cooling part.

The finely divided okara obtained in Preparation 1 (solid content: 14%, temperature: 80° C.) was constantly fed to the jacketed outer tubing of one scraper type heat exchanger (Contherm™) to be used as the heating part at a rate of 900 kg/hour by a force pump and Mono Pump™ for sterilization. The clearance between the inner wall and the rotor in Contherm™ was about 20 mm and the rotor revolved at a rate of 300 r.p.m.

For elevating a sterilization temperature, saturated steam at 8 kg/cm$^2$ (gauge pressure, saturated vapor temperature: 175° C.) was provided to the jacketed part of the scraper type heat exchanger.

For preventing scorching, sterilized tap water was provided to the mechanical seal part of the revolving portion of the rotor.

The holding tubing was a 2-inch tube (inner diameter: 50 mm, length: 2 m). The holding tubing had a back pressure-adjusting valve at an appropriate part thereof so that the holding (retention) time in the holding tubing was 8 seconds. When back pressure was adjusted to 4 kg/cm$^2$ (gauge pressure), the temperature of okara was 140° C. (i.e. holding okara at 140° C. for 8 seconds).

The holding tubing was connected to the inlet end of another scraper type heat exchanger (Contherm™) to be used as the cooling part. A back pressure-adjusting valve was provided at the outlet end of the scraper type heat exchanger.

The temperature of the okara held at the holding tubing was dropped to 120° C. by adjusting the back pressure at the back pressure-adjusting valve of the heat exchanger for cooling to 1.2 kg/cm$^2$ (gauge pressure), and was run into the scraper type heat exchanger for cooling. The coolant used was chilled water at 15° C. and the outlet temperature of the scraper type heat exchanger for cooling was adjusted to 80° C.

The okara run out from the scraper type heat exchanger for cooling was transferred to a filler pressurized by sterilized air, a vertical pillow packaging machine (manufactured by Orihiro, Japan), and each 2 kg portion thereof was filled in a pillow type package under sanitary conditions.

The packed okara was cooled to 10° C. or lower over 12 hours in a refrigerator where cooled wind at 2° C. was blown uniformly throughout therein.

The resultant okara product had good physical properties such as good white color, no scorching, no discoloration, good hardness with good disentanglement and dispersibility which were suitable for a raw material of various food products even after storage at 5° C. for 1 week. The product had a good "tofu"-like taste without any scorched smell. Further, water retention characteristics were substantially the same as those before heating.

The number of microbe of the sterilized okara determined at 5° C. on one day after the production by Petri film (a measurement kit manufactured by Sumitomo 3M) was 0, while that of the starting material was the level of 10$^5$. Even when the okara packed in a pillow type package was stored at 35° C. for 2 days, it had good physical properties such as good taste, good mouthfeel, and good color and the number of microbe was 0 and, in case of 10-fold dilution, the level of 10.

Instead of holding okara at 140° C. for 8 seconds, okara was heated and held at 145° C. for 8 seconds or 130° C. for 200 seconds. In case of holding okara at 145° C. for 8 seconds, the product had a hard plate-like state after storage at 5° C. for 1 week and was hardly disentangled. Thus, the product had low dispersibility, which resulted in deterioration of properties of okara. In case of holding okara at 130° C. for 200 seconds, the product as a whole became hard after storage at 5° C. for 1 week and was hardly disentangled, though some soft parts were contained.

EXAMPLE 2

According to the same manner as described in Example 1, continuous sterilization of okara was carried out except that the finely divided okara obtained in Preparation 3 (solids content: 14%, temperature 80° C.) was used.

Although the resultant okara was somewhat blackish, it had a good taste without any scorched smell. Further, the resultant okara had good hardness even after storage at 5° C. for 1 week.

The number of microbe of the resultant okara was 0, while that of the starting material was the level of 10$^5$. Even when the okara packed in a pillow type package was stored at 35° C. for 2 days, the okara had good properties such as good taste, good mouthfeel and good color, and the number of microbe was 0 and, in case of 10-fold dilution, the level of 10.

EXAMPLE 3

According to the same manner as described in Example 1, continuous sterilization of okara was carried out by using the finely divided okara obtained in Preparation 1 (solids content: 14%, temperature: 80° C.). The sterilized okara was filled in 5 kg pillow type packages, cooled and stored. The okara had very white color and no scorching and discoloration were observed. Further, the okara had a good "tofu"-like taste without any scorched smell. Further, the resultant okara had good hardness even after storage at 5° C. for 1 week.

The number of microbe of the resultant okara was 0, while that of the starting material was the level of 10$^5$. Even when the okara packed in a pillow type package was stored at 35° C. for 2 days, the okara had good properties such as good taste, good mouthfeel and good color, and the number of microbe was 0 and, in case of 10-fold dilution, the level of 10.

EXAMPLE 4

According to the same manner as described in Example 1, continuous sterilization of okara was carried out by using the finely divided okara obtained in Preparation 1 (solids content: 14%, temperature 80° C.) and providing saturated steam at 8 kg/cm$^2$ (gauge pressure, saturated vapor temperature: 175° C.) to the jacketed part of the scraper type heat exchanger.

The holding tubing was a 3-inch tube (inner diameter: 75 mm, length: 2 m). The holding tubing had a back pressure-adjusting valve at an appropriate part thereof so that the holding time was 22 seconds at 130° C. The desired holding time was obtained by adjusting back pressure to 3 kg/cm² (gauge pressure).

According to the same manner as described in Example 1, each 2 kg portion of the sterilized okara was filled in a pillow type package.

The okara had very white color and no scorching and discoloration were observed. Further, the okara had a good "tofu"-like taste without any scorched smell. Further, the resultant okara had good hardness even after storage at 5° C. for 1 week.

The number of microbe of the resultant okara was 0, while that of the starting material was the level of $10^5$. Even when the okara packed in a pillow type package was stored at 35° C. for 2 days, the okara had good properties such as good taste, good mouthfeel and good color, and the number of microbe was 0 and, in case of 10-fold dilution, the level of 10.

EXAMPLE 5

According to the same manner as described in Example 1, continuous sterilization of okara was carried out by using the finely divided okara obtained in Preparation 1 (solids content: 14%, temperature 80° C.). The holding tubing was a 3-inch tube (inner diameter: 75 mm, length: 10 m). The holding tubing had a back pressure-adjusting valve at an appropriate part thereof so that the holding time was 150 seconds at 130° C. The desired holding time was obtained by adjusting back pressure to 3 kg/cm² (gauge pressure).

According to the same manner as described in Example 1, each 5 kg portion of the sterilized okara was filled in a pillow type package.

The okara had very white color and no scorching and discoloration were observed. Further, the okara had a good "tofu"-like taste without any scorched smell. Further, the resultant okara had good hardness even after storage at 5° C. for 1 week.

The number of microbe of the resultant okara was 0, while that of the starting material was the level of $10^5$. Even when the okara packed in a pillow type package was stored at 35° C. for 2 days, the okara had good properties such as good taste, good mouthfeel and good color, and the number of microbe was 0 and, in case of Petri dish method or 10-fold dilution, the level of 10.

COMPARATIVE EXAMPLE 1

According to the same manner as described in Example 1, continuous sterilization of okara was carried out except that the finely divided okara obtained in Preparation 2 heated to 80° C. was used (fed to the heat changer at a rate of 900 kg/hour by a face pump and Mono Pump). However, the okara could not be fed constantly and its temperature considerably varied and could not reach the desired sterilization temperature. Then, conditions for continuous sterilization could not be set.

COMPARATIVE EXAMPLE 2

According to the same manner as described in Example 4, continuous sterilization of okara was carried out except that the finely divided okara obtained in Preparation 2 adjusted to a water content of 86% by dilution with water was used. The holding tubing was a 3-inch tube (inner diameter: 75 mm, length: 2 m) and the okara was sterilized at 130° C. for 22 second.

The resultant okara became blackish and scorching was observed. In addition, "navel of soybeans" and hulls derived from soybeans were found throughout the okara. The scorched smell of the okara was too strong to eat and the taste was bad.

The number of microbe of the okara filled in a pillow type package was 20, while that of the starting material was the level of $10^5$. In case of 10-fold dilution in a Petri dish, the number of microbe was 40. When the okara packed in a pillow type package was stored at 35° C. for 2 days, the okara was rotten and the number of microbe was the level of $10^6$ or more.

The causes of rot are considered to be large particles of the okara which results in insufficient heating of the center part of okara, and adhesion of okara to the inner wall of the scraper type heat exchanger which results in inferior thermal conductivity.

COMPARATIVE EXAMPLE 3

According to the same manner as described in Example 1, continuous sterilization of okara was carried out except that the clearance between the inner wall of the Contherm™ and the revolving rotor was 2 mm. However, okara clogged in Contherm™ and the experiment was stopped.

COMPARATIVE EXAMPLE 4

According to the same manner as described in Example 1, continuous sterilization of okara was carried out by using the finely divided okara obtained in Preparation 1 (solids content: 14%, temperature 80° C.) and providing saturated steam at 8 kg/cm² (gauge pressure, saturated vapor temperature: 175° C.) to the jacketed part of the scraper type heat exchanger.

The holding tubing was a 3-inch tube (inner diameter: 75 mm, length: 10 m). The holding tubing had a back pressure-adjusting valve at an appropriate part thereof so that the holding time was 200 seconds at 110° C. The desired holding time was obtained by adjusting back pressure to 2 kg/cm² (gauge pressure).

According to the same manner as described in Example 1, each 2 kg portion thereof the sterilized okara was filled in a pillow type package.

The okara had very white color and no scorching and discoloration were observed. Further, the okara had a good "tofu"-like taste without any scorched smell. Further, the resultant okara had good hardness even after storage at 5° C. for 1 week.

The number of microbe of the resultant okara was 200, while that of the starting material was the level of $10^5$. When the okara packed in a pillow type package was stored at 35° C. for 2 days, the number of microbe was the level of $10^6$ or more and the okara was rotten.

As described hereinabove, according to the present invention, okara can be sterilized continuously without clogging of the inner wall of a scraper type heat exchanger and a pump.

What is claimed is:

1. A process for producing a wet okara product, which comprises finely dividing wet okara to a particle size of 10 to 100 μm, feeding the finely divided wet okara into a scraper type heat exchanger, continuously heating the finely divided wet okara at a temperature of not lower than 120° C. for a time sufficient to sterilize the okara, cooling the heated okara, and aseptically filling and sealing the cooled okara in a container or package, to obtain the wet okara product.

2. The process according to claim 1, wherein the wet okara has a water content of at least 70%.

3. The process according to claim 1, wherein the scraper type heat exchanger has an indirect heating part equipped with at least one scraper blade and outer tubing and is combined with a forced-feeding part, a holding part and a cooling part.

4. The process according to claim 3, wherein the cooling part is a scraper type heat exchanger.

* * * * *